Dec. 11, 1956 P. H. LEGARRA ET AL 2,773,549
CUTTING DIE FOR GLASS FIBERS
Filed Aug. 13, 1952 2 Sheets-Sheet 1

INVENTORS
PHILIP H. LEGARRA
MAC C. CUTLER
BY
ATTORNEYS

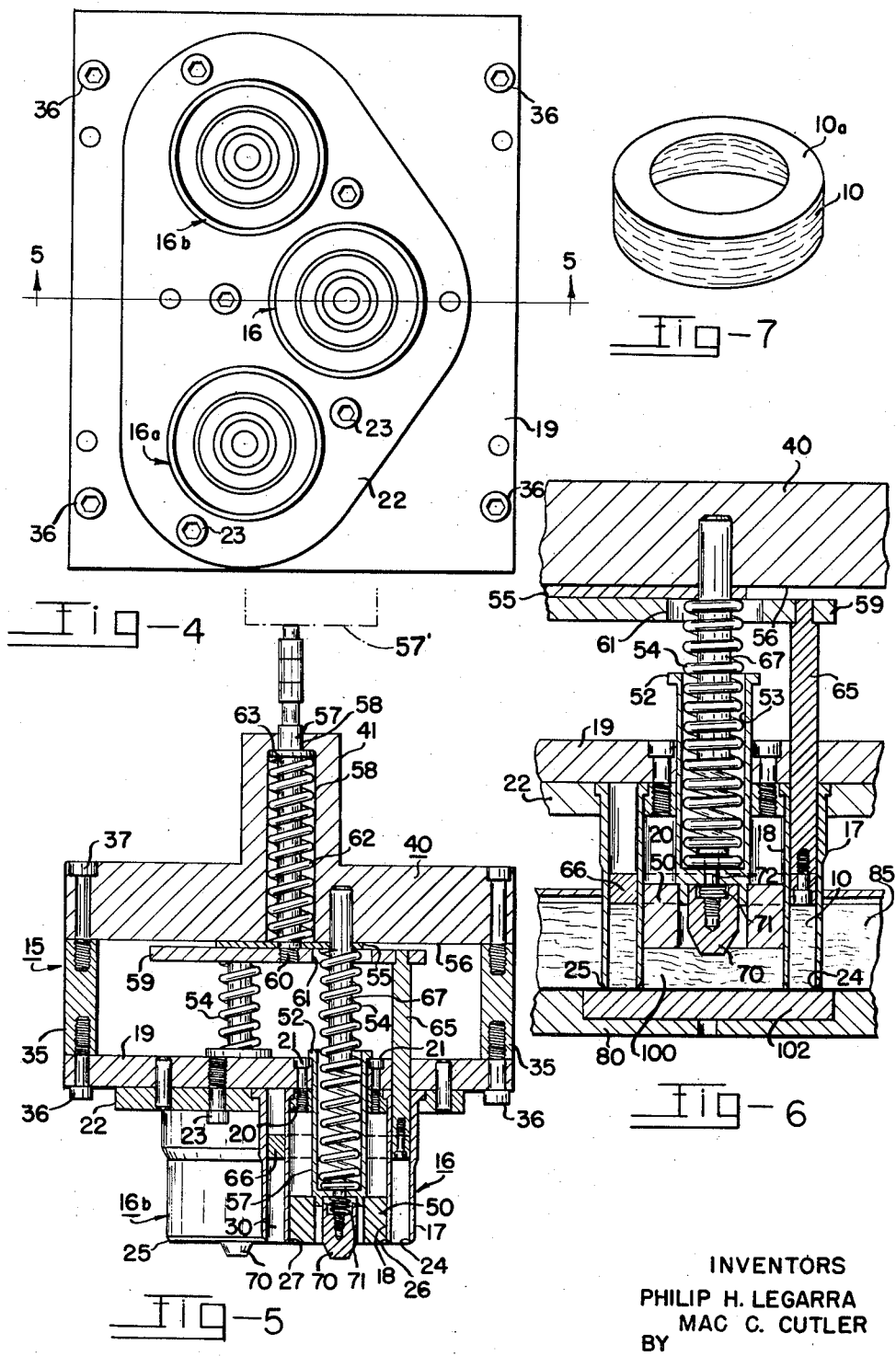

United States Patent Office 2,773,549
Patented Dec. 11, 1956

2,773,549

CUTTING DIE FOR GLASS FIBERS

Philip H. Legarra and Mac C. Cutler, Santa Clara County, Calif., assignors to Vibradamp Corporation, Santa Clara, Calif., a corporation of California Application August 13, 1952, Serial No. 304,115

6 Claims. (Cl. 164—13)

This invention relates to a method and apparatus for cutting predetermined shapes from bonded glass fibrous material of controlled density.

Glass fibrous material consisting of bonded glass fibers compressed to a controlled density and thereafter pressure-cycled to compress or deflect the material to obtain stabilized physical characteristics in the material is currently being used as shock absorbing material and for spring support of objects. The glass fiber shock absorbing material, or spring material, is like that disclosed in the co-pending application of Joachim G. Bush, Serial No. 268,049, filed January 24, 1952, now U. S. Patent 2,600,843, and is produced in accordance with the method disclosed therein, said patent being assigned to the same assignee as this application.

According to the disclosure of the aforesaid application, glass fibers having an average diameter of from 0.00005" to 0.00025" are produced in a manner well known in the art, and in their production they are coated with a binding agent, such as a phenol formaldehyde resin in an uncured state. The glass fibers so produced are assembled into mats of controlled weight per cubic foot with the binding agent thereon still in an uncured condition. The assemblage of glass fibers is then compressed to a controlled density under established dimensional limitations and the resin is cured while the assemblage of glass fibers is held at the controlled density so as to obtain a glass fibrous material of a controlled thickness and of a controlled density at that thickness. In such an assemblage of glass fibers, the fibers lay generally in a common direction throughout the material so that application of pressure to the material will be occasioned normal to the general lay of the glass fibers.

Such an assemblage of glass fibers of a particular controlled density is adapted to support a given pressure under a given degree of deflection or compression. For example, glass fibrous material made in accordance with the aforesaid application having a density of six pounds per cubic foot will support about seven pounds per square inch at 35% deflection or compression of the material, whereas glass fibrous material having a density of twenty pounds per cubic foot will support about two hundred fifty pounds per square inch at 35% deflection of the material.

Glass fibrous shock absorbing material, or spring material, produced in accordance with the aforesaid application has stabilized resilience characteristics such that a constant springing action is obtained upon compression of the material in much the same manner as a coil spring. To obtain a stabilized spring rate of the material, it is required that the material be cold-worked or pressure-cycled in a manner that the bonded glass fiber material is compressed to a value of about 10% greater than that to which it will normally be compressed under the load that it is to support. That is, if the glass fiber material is to support a load of fifty pounds per square inch at 25% deflection, the material will be pressure-cycled to approximately 27.5% deflection so that the material will be stabilized at a constant deflection rate when supporting the fifty pounds per square inch load at 25% deflection.

To manufacture shaped products from glass fibrous shock absorbing material, or spring material, produced as aforesaid, it is essential that the glass fibrous material shall not be compressed at any time during the shaping of an article to a value greater than that to which it will be compressed when supporting the maximum load for which it is designed, or else the deflection rate of the shock absorbing material is changed.

It is, therefore, an object of this invention to provide an apparatus and method for producing shaped articles from bonded glass fibrous shock absorbing material that has been pressure-cycled in a manner to eliminate compression of the shaped article during working of the glass fiber material in the process of producing the shaped article.

It is another object of the invention to provide a method and apparatus for performing the foregoing object wherein compression of the glass fibrous material required for shaping of the article is occasioned in the waste material rather than in the shaped article.

It is another object of the invention to provide a method and apparatus for obtaining the results of the foregoing objects wherein the shaping of the glass fibrous material is occasioned by a shearing process.

It is another object of the invention to provide a method and apparatus for obtaining the results of the foregoing objects by producing the shaping of the article in a cutting die.

It is still another object of the invention to provide a cutting die mechanism by which the cutting pressure of the die is applied to the waste glass fibrous material rather than to the product being shaped.

Further objects and advantages will become apparent from the drawings and the following description.

In the drawings:

Figure 4 is an elevational view taken along line 4—4 of Figure 1.

Figure 5 is a cross-sectional view taken along line 5—5 of Figure 4.

Figure 6 is a cross-sectional view like Figure 5 but illustrating the apparatus as used for cutting a shaped article.

Figure 7 is a perspective view of the article produced on the apparatus illustrated.

Figures 1, 2, 3:
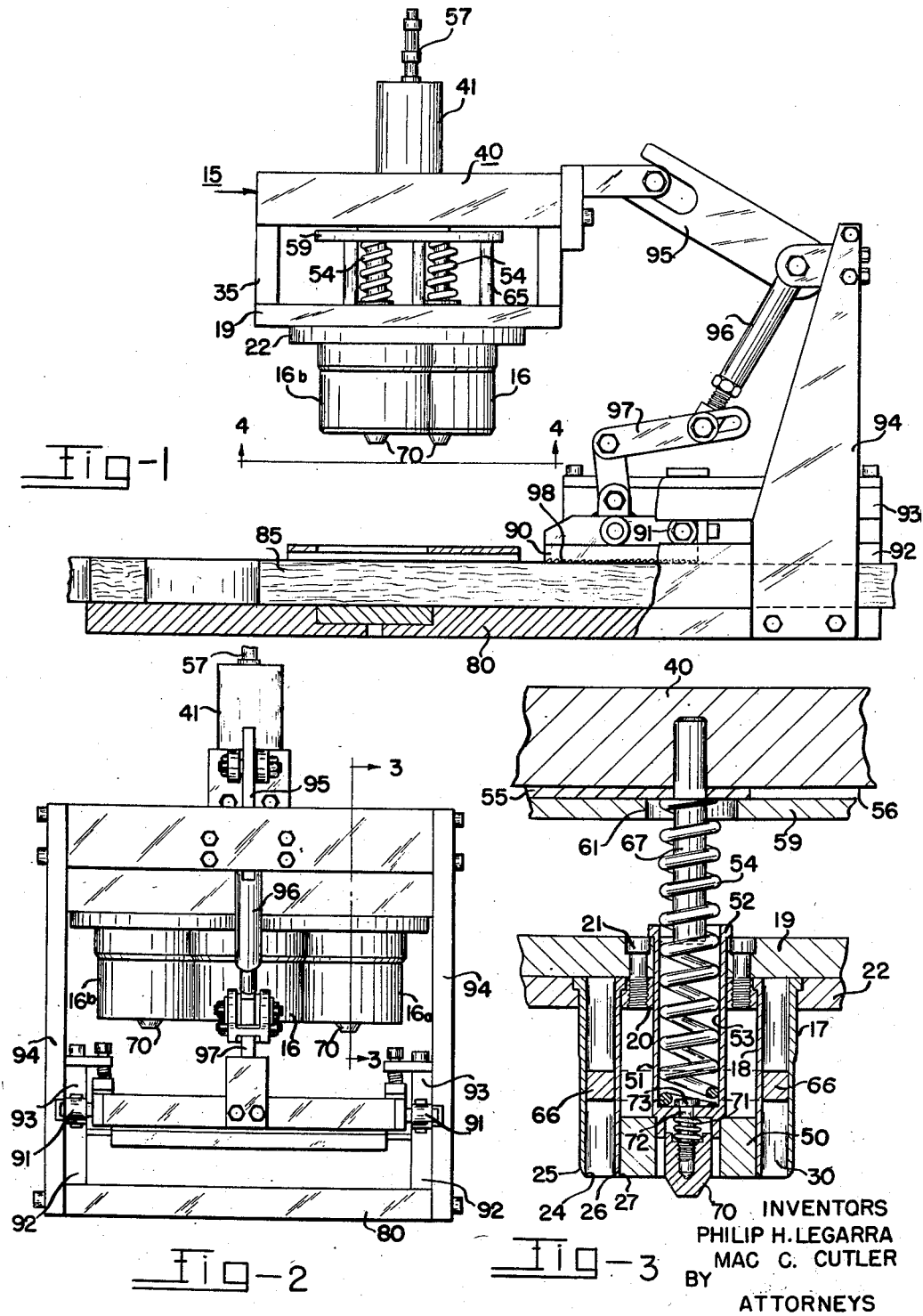
Figure 1 is an elevational view, particularly in cross-section, of a side of an apparatus incorporating the features of this invention.
Figure 2 is an end elevational view of the apparatus of Figure 1 as taken from the right-hand end of the device.
Figure 3 is a cross-sectional view taken along line 3—3 of Figure 2.

In this invention the cutting die is constructed and arranged for producing a cylindrical article as illustrated in Figure 7. The article 10 of Figure 7 has a generally cylindrical form and is used as a spring in a shock-absorbing system, the glass fibrous material of which the article 10 is produced being made in accordance with the co-pending application hereinbefore referred to.

The cutting die for producing the article 10 of Figure 7 consists of a die holder 15 carrying the cutting dies 16, 16a and 16b. Since all of the cutting dies are alike, only one of them will be described.

The cutting die 16, more particularly shown in Figures 3 and 5, consists of an outer cylindrical die cutter 17 and an inner cylindrical die cutter 18 that are retained in spaced annular relationship. Inner die cutter 18 is secured to the plate 19 by means of a ring 20 held to the plate 19 by the cap screws 21. The outer die cutter 17 is secured to the plate 19 by a ring 22 secured to the plate 19 by the cap screws 23. The shoulders on the upper ends of the die cutters 17 and 18 engaged by the rings 20 and 22, respectively, retain the die cutters to the plate 19 and the rings concentrically locate the die cutters 17 and 18 relative to one another.

The lower edge of the die cutter 17 has the knife edge 24 thereon, the die cutter 17 being ground away on the outer annular face to provide the angular face 25 annularly surrounding the knife edge 24.

The die cutter 18 is provided with a knife edge 26 with the angular face 27 surrounding the knife edge 26. It will be noted that the knife edge 24 is formed on the inner annular periphery of the die cutter 17 and the knife edge 26 is formed on the outer annular surface of the die cutter 18. Thus the knife edges 24 and 26 are adjacent one another with the angular knife faces 25 and 27 annularly surrounding the annular space 30 provided between the die cutters 17 and 18, which space is that which receives the wall 10a of the product 10 when the product is cut from a sheet of glass fibrous material.

The plate 19 that supports the dies 16, 16a and 16b is secured to spacer members 35 by means of cap screws 36, which spacer members in turn are secured to a carrier member 40 by means of cap screws 37. The carrier member 40 has a centrally-positioned extension 41 adapted to be secured to the vertically reciprocating member of a press for producing vertical movement of the die holder 15.

Each of the dies 16, 16a and 16b is provided with a centrally-positioned pressure member 50 that slides internally of the cutting die 18. This pressure member 50 is carried upon the lower end of a plunger 51 that slides within an opening provided in the plate 19 and the ring 20, and shoulder 52 on the upper end of the plunger 51 engages the plate 19 to limit downward movement of the plunger 51. The plunger 51 has a central hole 53 therein which receives one end of a compression spring 54 that extends between the plunger 51 and a plate 55 that is positioned against the lower face 56 of the carrier member 40. The plate 55 surrounds an actuating rod 57 that passes through an opening 58 in the extension 41. The lower end of the rod 57 carries an actuating plate 59 by the threaded connection 60. The plate 59 is provided with holes 61 therein through which the compression springs 54 pass. The compression springs 54 retain the plate 55 against the bottom surface 56 of the member 40, the plate being provided to support the compression spring 62 that extends between the plate 55 and the boss 63 carried on the plunger or rod 57 whereby to hold the plate 59 in the upper position illustrated in Figure 5.

The actuating plate 59 carries a rod 65 that connects with a knockout ring 66 slidably positioned in the space 30 between the cutting dies 17 and 18. The knockout ring urges the product 10 out of the space 30 at the end of the cutting operation.

The compression springs 54 position the pressure members 50 in the lower position thereof, as illustrated in Figures 3 and 5, the upper end of the springs 54 being supported by guide pins 67.

The pressure members 50 each carry a pilot pin 70 urged downwardly by compression spring 71 to pin down and prevent lateral shifting of the mass of glass fibers to be cut by the die, the pin 70 being carried on a pin 72 slidable in an opening in the bottom wall of the plunger 51 and having an enlarged head 73 to limit downward travel of the pin 72.

The die holder 15 is adapted to be carried in any reciprocating press structure by means of the extension 41 for vertical reciprocation of the dies and the holder. The actuating rod 57 also is adapted to be actuated by the press as by bringing the rod 57 into engagement with a stop means 57' on the press as the die holder 15 is moved upward after completion of a cutting operation for movement of the rod downwardly during the end of the upward stroke of movement of the die holder 15 for thereby causing operation of the knockout rings 66 to move the finished product out of the space 30 between the die cutters 17 and 18.

The die holder is vertically reciprocable over a stationary bed 80, as illustrated in Figure 1. The stationary bed 80 supports the glas fibrous material 85 from which the product 10 is cut upon operation of the die holder.

The glass fibrous material 85 is produced in mat or block form of a predetermined thickness and density for feeding beneath the dies during reciprocation of the same for thereby cutting cylindrical products 10 from the pad or block of glass fibrous material.

The feeding mechanism consists of a shoe 90 having rollers 91 at opposite sides of the shoe that are carried between the tracks 92 and 93 at each side of the shoe 90 to guide the shoe in horizontal reciprocating movement. The tracks 92 and 93 are secured to suitable upright supporting members 94 positioned at opposite sides of the bed 80.

The shoe 90 is reciprocated by means of a lever system 95, 96, 97 in a manner that upon downward movement of the die holder and the dies, the shoe 90 is moved in a rightward direction, as viewed in Figure 1, a distance equivalent to the length of glass fibrous material 85 that will be fed forward beneath the dies. During the upstroke of the dies and die holder, the lever system 95, 96, 97 advances the shoe 90 so that the serrated surface 98 of the shoe 90 frictionally engages the glass fibrous material 85 and advances it forwardly a sufficient distance to provide for the next cutting operation upon downward movement of the dies and die holder.

In cutting a cylindrical article, such as the product 10, from the glass fibrous material 85, downward movement of the die cutters 17 and 18 causes the knife edges 24 and 26 to sever the glass fibers and thereby produce an annular ring of material. Pressure required to sever the fibers is occasioned in a glass fibrous material outside the dimension of the cylindrical member that is being cut by the outwardly facing knife faces 25 and 27. Also, pressure applied to the glass fibrous material to retain it in position beneath the cutting dies is occasioned by the pressure pad 50.

In such cutting of resilient glass fibrous mats, there is a tendency for lateral shifting to occur particularly on the upper surface of the mat material and slight movements of this nature have a tendency to produce excessive forces on certain parts of the mat material. In the operation of applicants' pressure member 50, the pilot pin 70 is forced into the central waste material of the fibrous mat in advance of the engagement of the upper surface of the mat by the cutting tools to prevent lateral movement of the fibrous material during cutting and to avoid unnecessary pressure near the area in which the cut is being made. In addition, applicants' pressure member which compresses the waste fibrous body during the cutting of the shaped article assists the pilot pin in the prevention of lateral movement by compressing the fibrous mat material during the cutting thereof so that as the cutting tool penetrates into the resilient mat, the grip against lateral movement increases and reaches a maximum during the major portion of the cutting operation. With such an arrangement it is possible to cut out the desired pieces at a rapid rate without injury of the spring-like properties during such high speed cutting.

As the cylindrical article 10 is cut from the glass fibrous material 85, the article is received within the space 30 between the cutting dies 17 and 18 so that there is no compression pressure applied to the article during the cutting operation which would in any way affect the physical characteristics preestablished in the glass fibrous material.

When the cutting dies 17 and 18 move downwardly through the fibrous material, the cutting knives shear the material in planes that are exactly co-extensive with the inner and outer surfaces of the cylindrical article being formed. The angular faces 25 and 27 of the cutting dies 17 and 18 cause all of the shearing pressure to be applied radially outwardly relative to the surfaces that are being formed by the shearing action of the knives. Thus, there is no compression pressure on the article being formed, all compression pressure or shearing pressure being applied in the waste material on the outside of the cutting dies.

On the upward movement of the cutting dies 17 and 18, the glass fiber product 10 is lifted bodily out of the mat or block of glass fibrous material 85, the pressure pad 50 retaining pressure on the waste central core 100 until the product 10 has been removed from the glass fibrous material, the pressure being applied by the compression spring 54.

As the die holder 15 moves to its upper position, the actuating rod 57 engages a stationary part of the press to cause downward movement of the actuating member 59 and the rod 65 to move the knockout rings 66 downwardly in the space 30 and thereby eject the glass fiber product 10 from the space 30.

To prevent the knife edges 24 and 26 from being damaged during the cutting operation, a resilient pad 102 is provided in the bed 80 beneath each of the respective dies for engagement of the knife edges.

The glass fibers in the mat or block of material 85 lie generally in a common direction, that is, substantially parallel to the opposite faces of the material, and are severed by the cutting dies 17 and 18 as illustrated in Figure 6, to produce a cylindrical tubular shaped spring article, as shown in Figure 7.

While the apparatus disclosed and described herein illustrates a preferred form of the invention, yet it is understood that modifications that fall within the scope of the appended claims are intended to be included herein.

We claim:

1. A die for cutting a hollow tubular shaped article from a compressible fibrous body without subjecting the article cut therefrom to a compression load above a predetermined maximum, said die comprising a die holder, a generally tubular cutting member on said holder, said member having a first generally tubular cutting member conforming to the outer peripheral configuration of the article to be cut and a second generally tubular cutting member conforming to the inner peripheral configuration of the article to be cut, the second cutting member being positioned within the first cutting member and spaced therefrom to provide a chamber therebetween to receive uncompressed said shaped article cut from the fibrous body, said second cutting member defining in the interior thereof a second chamber for receiving waste fibrous body, a pressure member arranged in said second chamber yieldably urged downwardly for compressing the waste fibrous body during cutting of said shaped article, a pilot pin carried by said pressure member, and means for yieldably urging said pin to cause the same to protrude below the bottom of said pressure member, and to protrude below the cutting edges of the cutting members for engaging and penetrating the waste fibrous body prior to the contact of the cutting members with the work to prevent lateral shifting of the working during the cutting thereof, each of said cutting members having a cutting edge on the end periphery thereof with the angle face of the edge facing outwardly relative to the cut surface of the article cut thereby.

2. A die for cutting a hollow cylindrical shaped article from a compressible glass fibrous body without subjecting the article cut therefrom to a compression load above a predetermined maximum, said die comprising a die holder, a generally cylindrical cutting member on said holder, said member having a first generally cylindrical cutting member conforming to the outer peripheral configuration of the article to be cut and a second generally cylindrical cutting member conforming to the inner peripheral configuration of the article to be cut, the said second cutting member being positioned within the first cutting member and spaced therefrom to provide a chamber therebetween to receive uncompressed said shaped article to be cut from the fibrous body, said second cutting member defining in the interior thereof a second chamber for receiving waste fibrous body, and a pressure member arranged in said second chamber yieldably urged downwardly for compressing the waste fibrous body during cutting of said shaped article, each of said cutting members having a cutting edge on the end periphery thereof with the angle face of the edge facing outwardly relative to the cut surface of the article cut thereby, and a pilot pin carried by said pressure member said pilot pin being yieldably urged downwardly to depend below the bottom of said pressure chamber and to protrude below the cutting edges of the cutting members for engaging and penetrating the waste fibrous body prior to the contact of the cutting members with the work to prevent lateral shifting of the work during the cutting thereof.

3. A die for cutting a hollow tubular shaped article from a compressible fibrous body without subjecting the article cut therefrom to a compression load above a predetermined maximum, said die comprising a die holder, a generally tubular cutting member on said holder, said member having a first generally tubular cutting member conforming to the outer peripheral configuration of the article to be cut and a second cutting member being positioned within the first cutting member and spaced therefrom to provide a chamber therebetween to receive uncompressed said shaped article to be cut from the fibrous body, said second cutting member defining in the interior thereof a second chamber for receiving waste fibrous body, and a pressure member arranged in said second chamber yieldably urged downwardly for compressing said waste fibrous body during cutting of said shaped article, each of said cutting members having a cutting edge on the end periphery thereof with the angle face of the edge facing outwardly relative to the cut surface of the article cut thereby, said pressure member comprising a plunger arranged in said second chamber, means for urging said plunger in compressing engagement with the fibrous body within said second cutting member, means comprising a pilot pin carried by said pressure member, and yieldable means urging said pin downwardly to depend below the bottom of said pressure member and to protrude below the cutting edges of the cutting members for engaging and penetrating the waste fibrous body prior to the contact of the cutting members with the work to prevent lateral shifting of the work during the cutting thereof.

4. A die for cutting a hollow tubular shaped article from a compressible fibrous body without subjecting the article cut therefrom to a compression load above a predetermined maximum, said die comprising a die holder, a generally tubular cutting member on said holder, said member having a first generally tubular cutting member conforming to the outer peripheral configuration of the article to be cut and a second generally tubular cutting member conforming to the inner peripheral configuration of the article to be cut, the said second cutting member being positioned within the first cutting member and spaced therefrom to provide a chamber therebetween to receive uncompressed said shaped article to be cut from the fibrous body, said second cutting member defining in the interior thereof, a second chamber for receiving waste fibrous body, and a pressure member arranged in said second chamber yieldably urged downwardly for compressing said waste fibrous body during cutting of said shaped article, each of said cutting members having a cutting edge on the end periphery thereof with the angle face of the edge facing outwardly relative to the cut surface of the article cut thereby, a knock-out ring slidable within said first-mentioned chamber arranged between said cutting members, an actuating member engaging said knock-out ring for movement of said knockout ring toward the cutting edge of said cutting members, spring means connected with said actuating member for normally positioning said knock-out ring inwardly of the chamber formed between said cutting members, and a pilot pin carried by said pressure member, and yieldable means urging said pin downwardly to depend below the bottom of said pressure chamber and to protrude below the cutting edges of the cutting members for engaging and penetrating the waste fibrous body prior to the contact of the cutting members with the work to prevent lateral shifting of the work during the cutting thereof.

5. A die for cutting a hollow cylindrical shaped article from a compressible fibrous body without subjecting the article cut therefrom to a compression load above a predetermined maximum, said die comprising a die holder, a generally cylindrical cutting member on said holder, said member having a first generally cylindrical cutting member conforming to the outer peripheral configuration of the article to be cut and a second generally cylindrical cutting member conforming to the inner peripheral configuration of the article to be cut, the said second cutting member being positioned within the first cutting member and spaced therefrom to provide a chamber therebetween to receive uncompressed said shaped article to be cut from the fibrous body, said second cutting member defining therewithin a second chamber for receiving waste fibrous body, and a pressure member arranged in said second chamber yieldably urged downwardly for compressing said waste fibrous body during cutting of said shaped article, each of said cutting members having a cutting edge on the end periphery thereof with the angle face of the edge facing outwardly relative to the cut surface of the article cut thereby, a knock-out ring slidable within said first-mentioned chamber provided between said cutting members and positioned normally therein away from the cutting edges of said member a distance sufficient to avoid substantial compression of a cut article entering the first chamber during cutting thereof, plunger means connected with said ring and extending exteriorly of said first-mentioned chamber for actuating said ring to eject a cut article from between the cutting members, spring means connected with said plunger for holding said ring in the said normal position, an actuating member opposing said spring and connected with said plunger for operating the same to eject a cut article from between said cutting members, and a pilot pin carried by said pressure member, said pilot pin being yieldably urged downwardly to protrude below the bottom of said pressure member and to protrude below the cutting edges of the cutting members for engaging and penetrating the waste fibrous body prior to the contact of the cutting members with the work to prevent lateral shifting of the work during the cutting thereof.

6. A die for cutting a shaped article from a body of resin-bonded glass fibrous material compressed to a predetermined density, said die comprising a die holder, a hollow cutting member carried by said die holder and conforming to the outer peripheral configuration of the article to be cut from said fibrous body, a second cutting member conforming to the inner peripheral configuration of said article and positioned within the confines of said hollow cutting member, a yieldable pressure member mounted within the confines of said second cutting member for applying pressure to the fibrous body encompassed by said second cutting member, and means comprising reciprocable knock-out ring means disposed between said first and second cutting members for contacting and ejecting the cut article from the die, said knock-out ring means being normally positioned out of compressive contact with said fibrous body during the cutting thereof, a pilot pin carried by said pressure member, and means for yieldably urging said pin to protrude below the bottom of said pressure member and below the cutting edges of the first and second cutting members.

References Cited in the file of this patent

UNITED STATES PATENTS

| | | |
|---|---|---|
| Re. 5,635 | Delkescamp | Oct. 28, 1873 |
| 126,295 | Hidden | Apr. 30, 1872 |
| 468,613 | Frist | Feb. 9, 1892 |
| 525,123 | Talcott | Aug. 28, 1894 |
| 885,237 | Frothingham | Apr. 21, 1908 |
| 1,806,266 | Sawle | May 19, 1931 |
| 1,945,992 | Boblett et al. | Feb. 6, 1934 |
| 2,275,525 | Halmrast | Mar. 10, 1942 |
| 2,324,857 | Leskiewicz | July 20, 1943 |
| 2,545,237 | Maby | Mar. 13, 1951 |

FOREIGN PATENTS

| | | |
|---|---|---|
| 221,365 | Germany | Apr. 28, 1910 |